(12) United States Patent
Kuhlmann

(10) Patent No.: US 8,720,358 B2
(45) Date of Patent: May 13, 2014

(54) RUDDER STOCK

(75) Inventor: Henning Kuhlmann, Hamburg (DE)

(73) Assignee: becker marine systems GmbH & Co. KG, Hamburg (DE)

( * ) Notice: Subject to any disclaimer, the term of this patent is extended or adjusted under 35 U.S.C. 154(b) by 155 days.

(21) Appl. No.: 12/752,498

(22) Filed: Apr. 1, 2010

(65) Prior Publication Data

US 2010/0251951 A1    Oct. 7, 2010

(30) Foreign Application Priority Data

Apr. 1, 2009   (DE) .................... 10 2009 015 234
May 28, 2009  (DE) .................... 10 2009 022 989

(51) Int. Cl.
B63H 25/06    (2006.01)

(52) U.S. Cl.
USPC .......................................... 114/162

(58) Field of Classification Search
USPC .......................................... 114/162, 165–172
See application file for complete search history.

(56) References Cited

U.S. PATENT DOCUMENTS

| | | | | |
|---|---|---|---|---|
| 5,415,122 A | * | 5/1995 | Shen | 114/162 |
| 5,456,200 A | * | 10/1995 | Shen | 114/162 |
| 6,227,131 B1 | | 5/2001 | Strong et al. | |
| 7,509,918 B2 | * | 3/2009 | Lehmann | 114/169 |
| 7,591,230 B2 | * | 9/2009 | Kluge et al. | 114/162 |
| 7,926,435 B2 | * | 4/2011 | Seo et al. | 114/165 |

FOREIGN PATENT DOCUMENTS

| | | |
|---|---|---|
| DE | 82 22 839 U1 | 5/1983 |
| DE | 37 42 255 C1 | 5/1989 |
| DE | 195 24 903 A1 | 4/1997 |
| DE | 102 05 657 A1 | 7/2002 |
| DE | 20 2005 013 583 U1 | 11/2005 |
| DE | 20 2007 012 480 U1 | 11/2007 |
| EP | 0579533 A1 | 1/1994 |
| EP | 2039497 A2 | 3/2009 |
| FR | 2780460 A1 | 12/1999 |
| GB | 2258032 A | 1/1993 |

\* cited by examiner

*Primary Examiner* — Daniel V Venne
(74) *Attorney, Agent, or Firm* — Kelly & Kelley, LLP

(57)   ABSTRACT

In order to achieve improved properties in a rudder stock for rudders for water vehicles, at least the lower end area of the rudder stock to be inserted into the rudder and to be mounted in the rudder has a non-metallic material.

25 Claims, 4 Drawing Sheets

RUDDER STOCK

Figure 1:
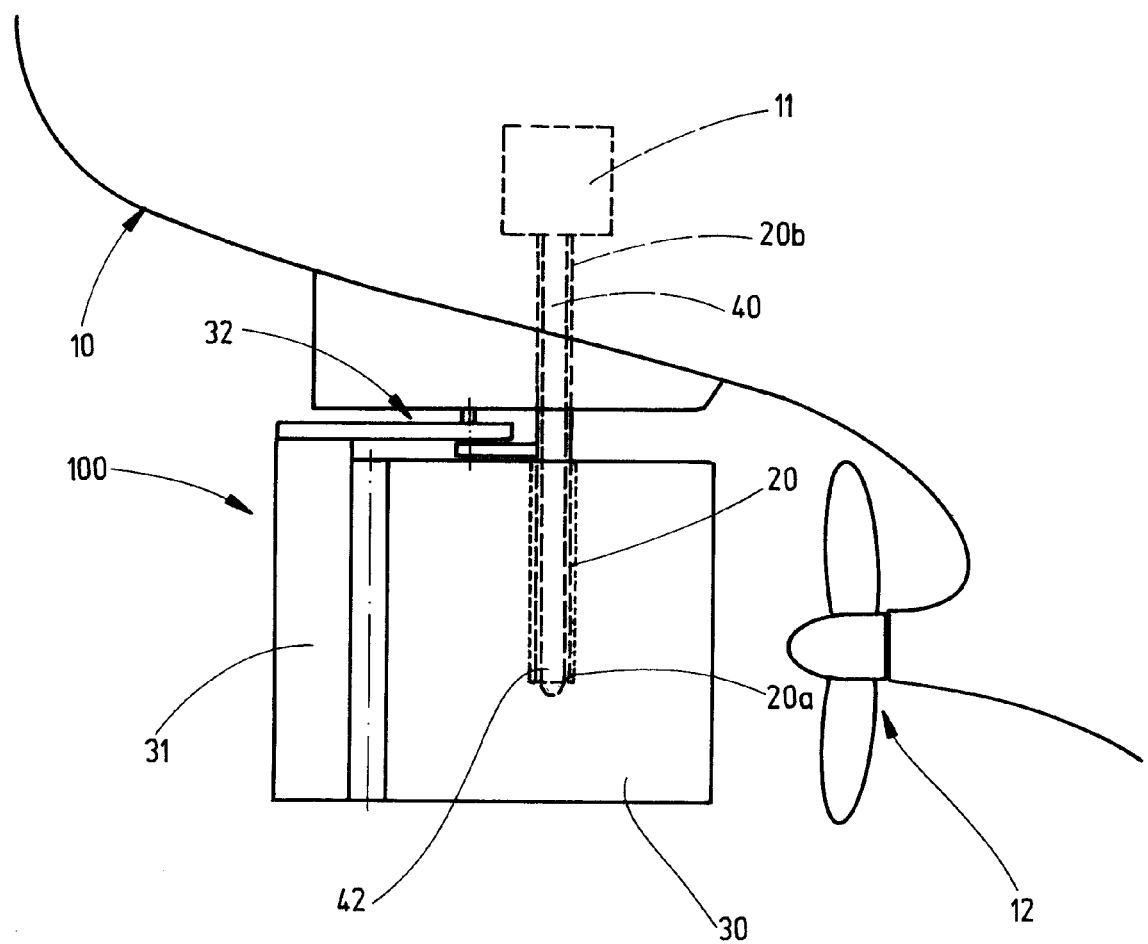

The invention relates to a rudder stock for rudders for water vehicles.

The control movement of the steering gear provided on board a water vehicle, a ship in particular, is generally transferred to the rudder through rudder stocks. Rudder stocks for rudders for water vehicles are predominantly made of metal, especially forged steel. Especially in the case of commercial ships like container ships, tankers or cruise ships, rudder stocks with greater lengths, partially with lengths over 10 m, are required. During the forging of these types of rudder stocks, difficulties may result as there are only a relatively small number of blacksmiths for this with corresponding capacity worldwide. Additionally, such rudder stocks also often have large diameters and thus a heavy weight, which in an extreme case can exceed the 100-t limit. This requires in turn specially trained and stable constructions of the mount and suspension of the rudder stock in the ship and of the rudder blade on the rudder stock.

Rudder stocks generally have a round cross-section and are stressed both in terms of bending and torsion, wherein the occurring bending loads to be absorbed are normally multiple times higher than the torsion loads. For this reason, the rudder stocks must be designed accordingly with respect to their bending stiffness or strength and high quality forged-steel materials are predominantly used in commercial ships. Rudder stocks hereby differ from shafts used in other technical fields, such as automobile construction, which are frequently stressed exclusively or at least primarily in terms of torsion. Furthermore, rudders stocks differ from other shafts through their dimensioning. Thus, rudder stocks for rudders for water vehicles, for which the present invention is especially suited, are normally at least 3 m long and at least 3.5 t heavy.

Furthermore, extremely high rudder forces occur, in particular in fast ships with highly stressed propellers, which are at least partially transferred to the rudder stock. Accordingly, it must have sufficient strength and bending stiffness. Depending on the type of rudder used, these demands can be increased further. Thus, for example in the case of spade rudders, which have neither a rudder horn nor an additional pivot journal bearing in the sole piece, the greatest demands are placed on the rudder stock with respect to forces to be increased.

In order to reduce the weight, in particular of large rudder stocks for large rudders and still retain sufficient bending strength or torsional stiffness, it was provided in DE 20 2005 013 583 U1 of the applicant to design a rudder stock such that an upper and a lower end area of the rudder stock are made of a metallic material, in particular forged steel, and a middle section interconnected with the two end areas is made of non-metallic material, in particular fiber-composite material. Through the design of the middle section made of non-metallic material, a weight reduction of the rudder stock is advantageously achieved. Furthermore, only the lower and the upper end area of the rudder stock need to be made of forged steel. For the production of the end areas, there are normally more forging capacities available than for the production of an entire rudder stock with a longer length made of forged steel.

The upper end area of a rudder stock is generally mounted inside the water vehicle and mechanically coupled with the steering gear so that the control movement of the steering gear can be transferred to the rudder. In contrast, the lower end area of the rudder stock is inserted into the rudder when installed and mounted in it. In the case of semi-spade rudders with a rudder horn, the mounting can take place outside of the rudder horn.

The object of the present invention is to specify a rudder stock for rudders for water vehicles, which have improved properties, in particular a reduced weight, with respect to the rudder stocks known from the state of the art.

The object based on the invention is solved through a rudder stock for rudders for water vehicles with the characteristics of claim 1.

In the case of the present invention, the lower end area of the rudder stock thus has a non-metallic material, in particular a fiber-composite material, or respectively the lower end area is made of it. The lower end area of the rudder stock comprises that end of the rudder stock, which is inserted into the rudder in the installed state and is mounted in the rudder/blade. (In the case of semi-spade rudders with a rudder horn, the rudder stock can also be mounted in the rudder horn itself. In the present context, the rudder horn is considered part of the rudder so that the case of a mounting in the rudder horn can generally be considered to be a mounting in the rudder.) It is hereby advantageous that the weight of the rudder stock can be reduced overall through the use of non-metallic material for the lower end area of the rudder stock. Moreover, the diameter of the rudder stock can hereby also be reduced with respect to lower rudder stock end areas made of forged steel.

A fiber-composite material, in particular carbon fiber composite material, is used as the non-metallic material. Fiber-composite plastics or other fiber-composite materials can also be used. Graphite fibers in particular can be used as carbon fibers. The advantage of the use of non-metallic materials, and in particular of fiber-composite materials, lies in the lower weight and in the case of fiber-composite materials in the high rigidity and strength of the material. The use of non-metallic material also in the lower end area of the rudder stock, which is mounted in the rudder or respectively in the rudder horn and is that part of the rudder stock that is impacted by the highest loads, in particular bending loads, is particularly suitable for fast ships with highly stressed propellers.

In a preferred embodiment of the invention, both the lower end area of the rudder stock as well as the middle area arranged between the lower and the upper end area of the rudder stock and interconnected with both end areas have non-metallic material, in particular fiber-composite materials. The upper end area of the rudder stock can also have non-metallic material so that then the entire rudder stock has non-metallic material or respectively is made of non-metallic material. The predominant design of the rudder stock made of fiber-composite materials has among other things the great advantage that the weight of the rudder stock can be considerably reduced with respect to conventional rudder stocks made entirely of metal, in particular forged steel. Thus, a rudder stock manufactured according to the invention made of fiber-composite material can have from half to one-fourth the weight of a comparable rudder stock made of forged steel.

In this connection, it is preferred in particular that the rudder stock is mainly made of a tube made of fiber-composite material. However, if applicable, the upper end area of the rudder stock to be coupled with the steering gear of the water vehicle can also be made of a metallic material, in particular forged steel. The upper end area made of forged steel is then to be permanently connected with the fiber-composite tube. The design of the upper end area of the rudder stock made of a metallic material can be advantageous in order to ensure compatibility of the rudder stock with the steering gear of the ship in the coupling area. The coupling of the upper end area of the rudder stock to the steering gear can for example be performed through bolting but also through other suitable connection means known from the state of the art.

In the present connection, the term "tube" means any long hollow body, wherein the present fiber-composite tube is preferably designed cylindrically with a consistent diameter over the entire length of the tube for technical manufacturing reasons. Furthermore, one or more other bodies, e.g. a winding mandrel or the like remaining in the rudder stock, can generally be arranged within the fiber-composite hollow body. For the production of such a rudder stock, winding methods known in particular from the state of the art can be used for fiber-composite material, in which the fibers are wound around a cylindrical winding mandrel or the like. In general, however, the tube could also be designed towards the upper end area as a tapered cylinder or respectively as a cone, since there are lower forces in the upper area of the rudder stock and thus a smaller diameter is sufficient. If the upper end area of the rudder stock is made of metal, the connection between the fiber-composite or respectively the carbon fiber reinforced tube and the metal upper end area can thereby be achieved in particular in that the upper end area on its side facing the fiber-composite tube has a pin-like protrusion around which the fibers of the fiber-composite tube can be wound. Alternatively or additionally, gluing by a suitable adhesive, such as resin or the like, can take place. For example, the connection between the upper end area made of metallic material and the fiber-composite tube like the connection disclosed in DE 20 2005 013 583 U1 can be designed between the upper stock end and the middle rudder stock area. The disclosure in DE 20 2005 013 583 U1 is hereby expressly referenced as an object of the present invention.

Through this embodiment, a rudder stock, which also has fiber-composite material in the lower end area, can be produced in a relatively easy manner. Furthermore, it is advantageous that the middle area of the rudder stock is also made of fiber-composite material so that the rudder stock has no transition point between the lower end area and the middle area of the rudder stock. This is in contrast to the rudder stocks known from the state of the art, in which the middle area is made of fiber-composite material and the two end areas are made of metal, whereby a potential weak spot results in the rudder stock through the connection area between the lower end area and the middle area. Furthermore, this connection area generally has especially high bending loads, so that there could potentially be damage to the rudder stock. In the connection area between the upper end area and the middle area of the rudder stock, the bending loads are in contrast considerably lower so that damage is not expected here. Furthermore, in the case of a continuous design of the rudder stock without a transition point between the lower end area and the middle area of the rudder stock connecting to the lower end area, a smaller rudder stock cross-section can be selected, which is advantageous for the weight and the dimensioning of the rudder overall.

For technical manufacturing reasons, the rudder stock is designed as a fiber-composite tube and thus with a hollow space. However, a massive design of the rudder stock made of a non-metallic material is generally also conceivable.

In order to always ensure sufficient strength, in particular bending strength, also in the case of rudders with very large dimensions and thus exerting very high loads on the rudder stock, it is provided in a further preferred embodiment of the invention that a supporting body is provided in the lower end area of the rudder stock. This supporting body is designed to support the rudder stock against external force effects, in particular against bending loads. The supporting body is preferably made of metal, for example steel or stainless steel. Supporting bodies made of steel can be advantageous based on their material properties or strengths, respectively. Such supporting bodies can for example be manufactured separate, e.g. by means of a turning lathe or the like, and then provided on the lower end area or respectively inserted into it. However, it is generally also possible to easily design supporting bodies made of non-metallic material, for example fiber-composite plastic or the like. In the case of a rudder stock designed in a hollow manner or respectively a lower end area of the rudder stock designed in a hollow manner, it is particularly advantageous to arrange the supporting body inside the rudder stock. In this respect, the present embodiment can advantageously be provided with rudder stocks designed as a fiber-composite tube. The provision of a supporting body in the lower end area is advantageous because the highest loads on the rudder stock generally occur there.

The supporting body can generally be designed in any suitable form or dimension respectively as long as it evokes a supporting effect against external force effects for the lower end area of the rudder stock. If the supporting body in a hollow rudder stock is arranged inside the rudder stock, it is advantageously designed such that it rests fully or at least partially against the rudder stock and thus the forces impacting the rudder stock can be transferred to the supporting body at least partially. It is particularly advantageous in this connection that the supporting body is permanently connected with the tube. On one hand, the interconnection between the rudder stock and the supporting body and thus the supporting effect is hereby improved; on the other hand, it is ensured that the supporting body is always located in the position that achieves the best supporting effect. Depending on the selected material, the dimensioning and the arrangement of the supporting body, the connection between the supporting body and the rudder stock can take place in different, suitable manners. For example, shrink fitting, the designing of a fitting assembly and gluing are named here.

Furthermore, especially in the case of the supporting body arranged inside the lower end area of the rudder stock, it is advantageous if it has a force transmitting/mounting element on the rudder stock for the rudder blade installation in order to pass installation forces into the carbon fiber reinforced body. This force transmitting/mounting element preferably protrudes in the longitudinal direction of the rudder stock from the rudder stock. The force transmitting/mounting element can be provided in particular in order to ensure the fastening of the rudder stock with the rudder blade. In a particularly preferred exemplary embodiment, the force transmitting/mounting element has a thread for a nut arranged in the rudder blade, in particular a hydraulic nut or the like.

In another preferred embodiment of the invention, in which the supporting body advantageously rests at least partially on the lower end area of the rudder stock, at least a partial area of the surface of the supporting area is designed structured and/or profiled. In particular, this embodiment is advantageous in a supporting body arranged inside, around which a carbon fiber reinforced or respectively fiber-composite tube forming the rudder stock has been wound. The interconnection between the supporting body and the tube is improved through providing the structuring or profiling, respectively.

The supporting body is thus advantageously designed such that it has elastic, in particular bending elastic properties. The term "elastic" is understood in this context in that the supporting body is designed such that it gives way under force effects, i.e. its initial shape in the case of force effects, even if it is just slightly, can change and returns to its original shape when the acting force goes away. In this respect, a bending elastic design of the supporting body is advantageous since the lower rudder stock area is mainly stressed in terms of bending. It is hereby possible that the supporting body buckles in the case of an extremely high bending load if applicable without this high load leading directly to the breakage of the supporting body or the like. In this respect, it is advantageous that the supporting body has certain elastic properties. If applicable, small changes in the shape can hereby be sufficient for the purpose described above.

In this embodiment, it is preferred to design the supporting body as a hollow body. The supporting body advantageously inserted into the inside of the rudder stock in the lower end area and resting on the rudder stock can deform inwards towards the hollow space in the case of high bending loads because of the design as a hollow body. In the case of massively designed supporting bodies arranged without clearance in the rudder stock, this type of elastic deformation, in particular in supporting bodies made of metal, would be difficult.

Furthermore, the supporting body is advantageously designed as two parts, wherein preferably at least one of the two supporting body parts, particularly preferably both, have a circumferential, in particular ring-shaped web protruding from the supporting body part, which can be connected with the other supporting body part by forming a hollow space, in particular by means of an interference fit assembly.

Through this embodiment, two separate supporting body parts can be designed in a simple manner, which are combined together into a supporting body forming a hollow space. This considerably simplifies production and installation in the rudder stock. The protruding webs are preferably arranged in the outer area so that they rest on the interior surface of the rudder stock and support it. If a high bending load is now applied, the web areas of the supporting body can move inward towards the hollow area and thus buckle without damaging the supporting body. It would generally also be possible to assemble the supporting body from more than two parts.

Both the mounting of the rudder stock in a corresponding neck bearing as well as the connection of the rudder stock to the rudder blade takes place in the area of the lower end area of the rudder stock. In both cases, a force is applied here to the casing of the rudder stock from the outside. In order to protect the rudder stock from these force effects or to increase its overall stability or strength respectively, a protective liner is advantageously provided, which envelops the lower end area, at least partially. Thus, the protective liner is advantageously designed in a cylindrical manner. Furthermore, the protective liner advantageously rests with its entire inner surface against the exterior casing of the rudder stock and is permanently connected with it through suitable fastening methods, for example by means of shrink fitting. The protective liner is advantageously made of metal, in particular stainless steel.

As listed above, since the highest loads on the rudder stock occur in the area of the rudder blade connection located in the lower end area and/or in the area of the mounting of the rudder stock in the neck bearing, the supporting body is advantageously arranged in one of the two areas or particularly preferably in both aforementioned areas (neck bearing and rudder blade connection). Likewise, the protective liner is advantageously arranged in one of the two or in both named areas.

Furthermore, the object based on the invention is solved through a lower end area of a rudder stock, which comprises a supporting body for the support of the lower end area of the rudder stock against exterior force effects, around which the non-metallic material, in particular a fiber-composite material, is arranged. Thus, the supporting body is at least partially enveloped or enclosed by the non-metallic material. In the case of the use of fiber-composite material, it is advantageous that the fibers are wound directly onto the supporting body or at least onto parts of the supporting body in order to thus establish the best possible interconnection between the supporting body and the rest of the lower end area of the rudder stock.

Furthermore, the object based on the invention is solved through a method for the production of a lower end area of a rudder stock to be inserted into a rudder for water vehicles, in particular fast ships with highly stressed propellers, and to be mounted in the rudder, in which a supporting body made in particular of metal for supporting the end area of the rudder stock is provided against external force effects and fiber material is wound around the supporting body.

Furthermore, the object based on the invention is solved through a method for the production of a rudder stock of a rudder for water vehicles, in particular fast ships with highly stressed propellers, which comprises the following steps:

a.) provision of a supporting body, in particular made of metal,
b.) provision of a winding mandrel,
c.) arrangement of the winding mandrel next to the supporting body,
d.) creation of a fiber-composite tube through the winding of fiber material around the supporting body and around the winding mandrel,
e.) removal of the winding mandrel, if applicable, and
f.) if applicable, fastening of an upper end area in particular made of a metallic material and to be coupled with the steering gear on the end of the fiber-composite tube facing away from the supporting body.

In the case of the method according to the invention, a supporting body or respectively at least one supporting body part and a winding mandrel are provided and both arranged next to each other, in particular adjacent to each other. A winding mandrel is usually a cylindrical body frequently used in the production of fiber-composite materials, around which the fiber material is wound. After winding and completion of the body to be wound or respectively manufactured, the winding mandrel is frequently removed from the body. Such winding mandrels are also often referred to as "mandrels." However, the winding mandrel can also generally be provided in that it remains in the fiber-composite tube after winding of the fiber-composite body or respectively the fiber-composite tube. This can be the case in particular in the case of non-cylindrical winding mandrels, for example in the case of conical winding mandrels.

After arrangement of the winding mandrel and the supporting body, fiber material is wound around the supporting body and the winding mandrel in order to form the rudder stock body. The winding mandrel is removed, if applicable, after winding is done and completion of the rudder stock or respectively the part of the rudder stock made of fiber-composite material. Furthermore, if applicable, an upper end area made in particular of a metal material and to be coupled with the steering gear of the water vehicle can now be attached to the fiber-composite tube forming the rudder stock. Since the supporting body is arranged in the lower end area of the fiber-composite tube, the upper end area is advantageously arranged on the end of the fiber-composite tube lying opposite the supporting body.

The supporting body is preferably designed as two parts and only the first supporting body part is used for the implementation of the aforementioned steps a.), c.) and d.). After completion of the winding and the removal of the winding mandrel, the second supporting body part is then inserted through the end of the fiber-composite tube facing away from the supporting body into the fiber-composite tube and is moved up to the first supporting body part. Then, the second supporting body part is advantageously and permanently connected with the first supporting body part and/or the fiber-composite tube.

Figure 2:
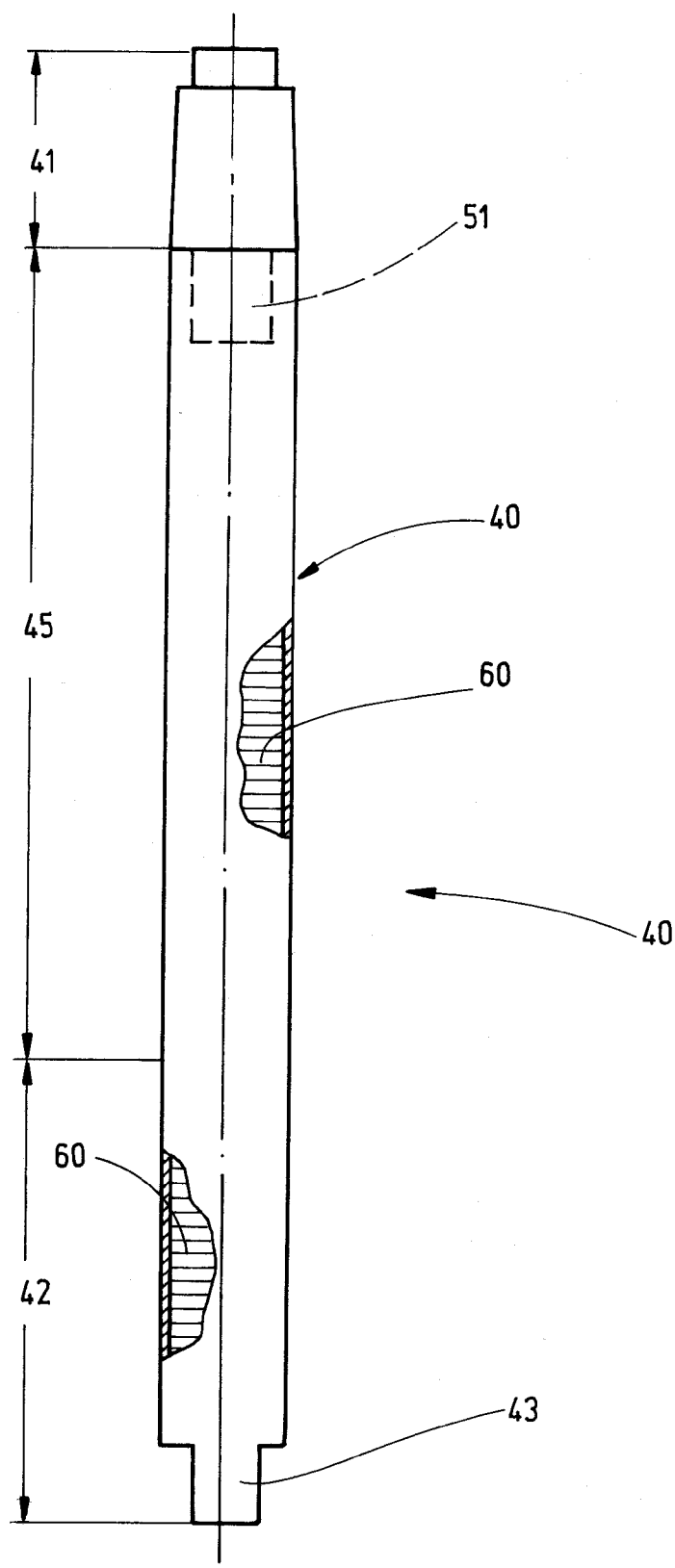
Figure 3:
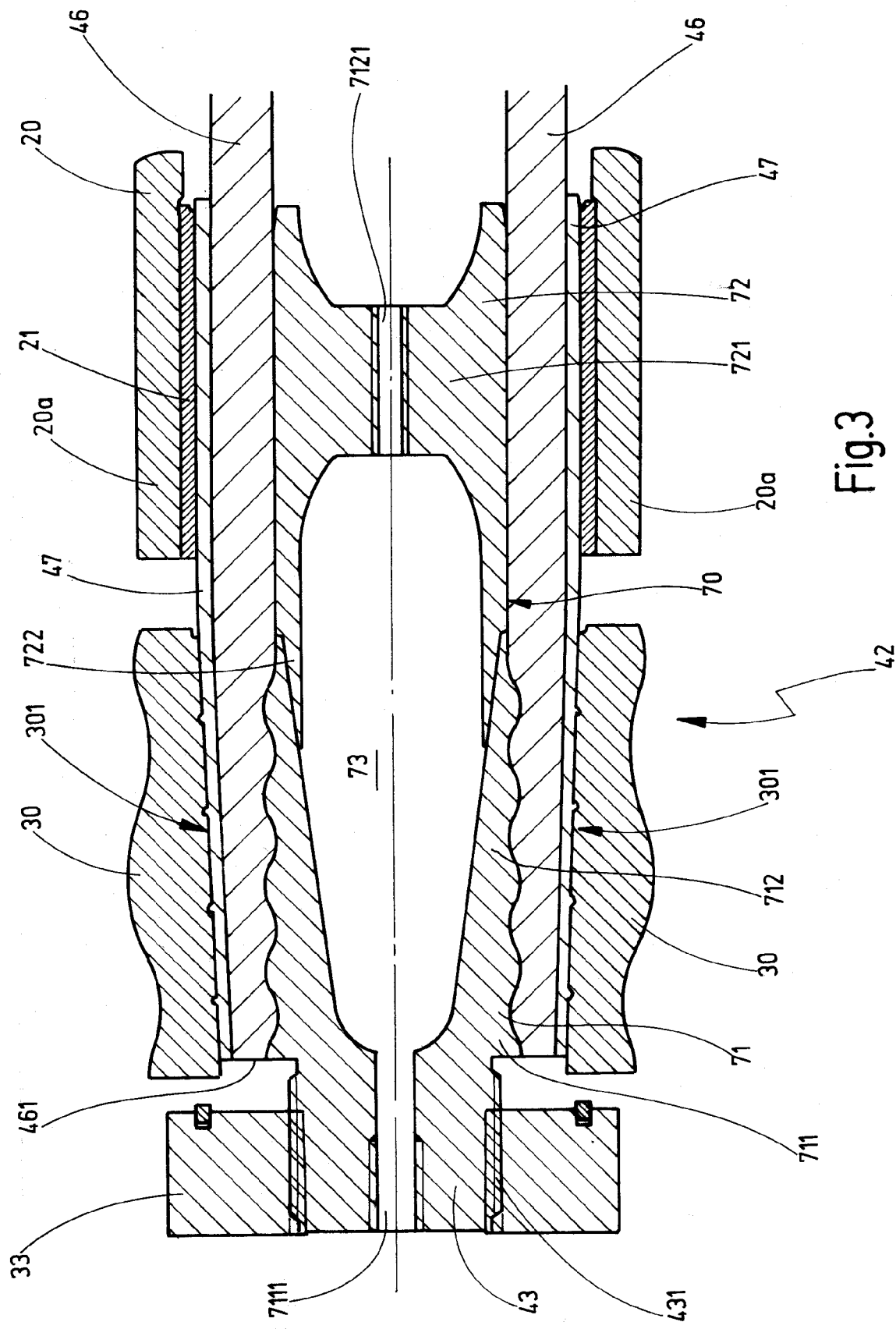
Figure 4:
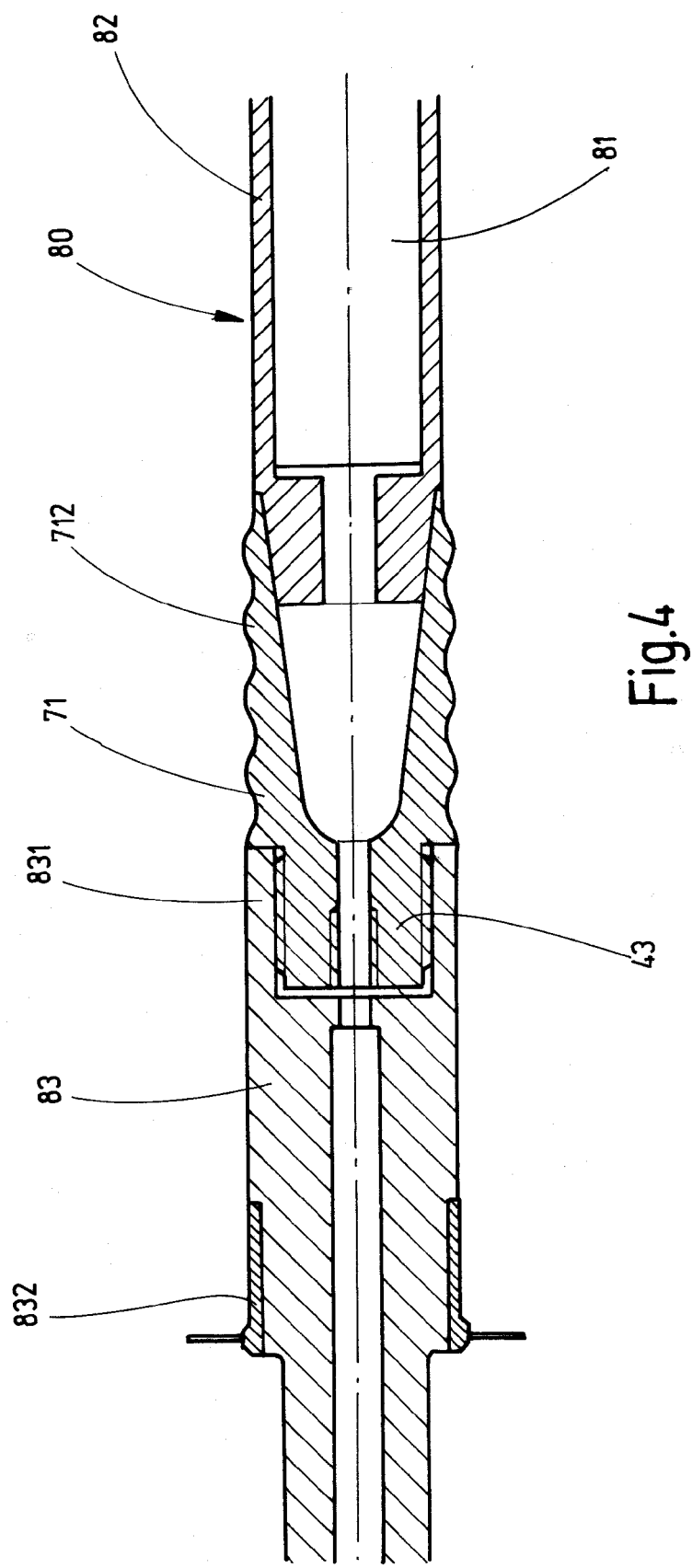

Preferred embodiments of the invention are shown in the drawings. The drawings schematically show in:

FIG. 1 a rudder provided in the aft ship area with a rudder stock arranged in a rudder trunk, FIG. 2 a view of a rudder stock, FIG. 3 a sectional view of the lower end area of a rudder stock with supporting body, and FIG. 4 a sectional view of a first supporting body part with winding mandrel.

FIG. 1 shows a rudder 100 with a rudder stock 40 according to the invention, a rudder blade 30 and a rudder trunk 20. The rudder trunk 20 designed as a cantilever is permanently connected with its upper end 20b with a ship's hull 10. The lower rudder trunk end 20a is inserted deep into the rudder blade 30. The rudder trunk 20 is designed as a hollow rudder trunk tube. On the inside, its upper end area is arranged with a rudder stock 40 according to the invention connected with a steering gear 11 provided in the ship's hull 10. The rudder stock 40 is fed through the entire rudder trunk 20 inserted into the rudder blade 20 and protrudes above the rudder trunk end 20a. The bottom end area 42 of the rudder stock 40 is arranged entirely in the rudder blade 30.

The rudder 100 is designed as a spade rudder with a fin 31 steerable by means of a fin steering 32 and is arranged behind the ship propeller 12 in the direction of travel of the ship's hull 10. However, it would also be generally easily possible to use the rudder stock 40 according to the invention in a rudder designed as a semi-spade rudder (with rudder horn) or in a rudder, which is mounted in the sole piece by means of a pivot journal bearing.

FIG. 2 shows a view of a rudder stock 40. The rudder stock 40 is subdivided into three areas, namely an upper rudder stock end area 41, a middle rudder stock area 45 and a lower rudder stock end area 42. The upper and the lower rudder stock end area 41, 42 are each directly adjacent to the middle rudder stock area 45. The upper end area 41, which can be connected to the steering gear 11 of a ship's hull 10, is made of forged steel. "Forged steel" means an iron with less than 0.8% carbon content. In contrast, the middle rudder stock area 45 as well as the lower rudder stock end area 42 are made of fiber-composite material, in particular carbon fiber. In particular, the middle rudder stock area 45 and the lower end area 42 are made of a mainly continuous trunk tube made of fiber-composite material. The windings of the fiber-composite material of the middle rudder stock area 45 and of the lower end area 42 are indicated with reference number 60. A pin-shaped force transmitting/mounting element 43 with a smaller diameter with respect to the rudder stock 40 protrudes from the lower end area 42 in the axial direction of the rudder stock 40. The upper end area 41 made of forged steel has a pin protruding in the axial direction of the rudder stock 40 towards the middle rudder stock area 45 indicated with the reference number 51, around which the section of the middle rudder stock area 45 facing the upper end area 41 can be wound. Other connection means, such as gluing or the like, are generally also possible.

FIG. 3 shows a longitudinal section of a lower end area 42 of a rudder stock. The lower end area 42 comprises a fiber-composite tube 46 made of fiber-composite material. The fiber-composite tube 46 forms (mainly) the rudder stock 40, wherein a supporting body 70 is provided inside the fiber-composite tube 46 in the lower end area 42. The supporting body 70 is designed as two parts and comprises a first supporting body part 71 and a second supporting body part 72. The first supporting body part 71 is arranged on the free end 461 of the fiber-composite tube 46. It comprises a base body 711 arranged on the end 461 of the fiber-composite tube 46, from which a web 712 resting on the fiber-composite tube 46, circumferential and arranged outside on the base body 711 protrudes into the fiber-composite tube 46. The entire first supporting body part 71 rests entirely on the inside of the fiber-composite tube 46. The protruding web tapers to its ends so that the hollow space between the webs expands conically away from the base body 711. The outer area or respectively the outer surface of the first supporting body part 71 is designed in a waved or respectively profiled manner. A mainly cylindrical force transmitting/mounting element 43, which has a smaller cross-section than the rudder stock 40, protrudes from the base body 711 in the direction away from the rudder stock 43. A thread 431 is provided on the surface of the force transmitting/mounting element 43. A hydraulic nut 33 is screwed onto the thread 431 of the force transmitting/mounting element 43. On one hand, the hydraulic nut 33 is designed to secure the rudder stock 40 in the rudder blade 30. On the other hand, the hydraulic nut 33 creates an interference fit assembly between the rudder stock and the rudder blade 30 in the rudder blade connection area 301. In this rudder blade connection area 301, the rudder blade 30 is adjacent to the rudder stock 40 or respectively to a protective liner 47 made of stainless steel enveloping the rudder stock 40 in the lower end area 42 by means of an interference fit assembly. The protective liner 47 lies on the exterior casing of the fiber-composite tube 46 and extends from the free end 461 of the fiber-composite tube 46 over the entire rudder blade connection area 301 up to the lower rudder trunk end 20a of a rudder trunk 20. A bearing (neck bearing) 21 is provided between the rudder trunk 20 and the protective liner 47 for the mounting of the rudder stock 40 in the rudder trunk 20. In the rudder blade connection area 301, the rudder stock 40 is designed conically and tapered towards the free end 461.

Like the first supporting body part 71, the second supporting body part 72 also rests with its entire outer surface against the inside of the fiber-composite tube 46 and has a mainly massive base body 721. A circumferential web 722 arranged outside on the base body 721 protrudes from this base body 721 in the direction of the free end 461 of the fiber-composite tube 46. In the end area of the webs 712, 722, the first and second supporting body part 71, 72 are connected by an interference fit assembly of the adjacent, wedge-shaped end areas of the webs 712, 722. A supporting body 70, which comprises a hollow space 73, which is bordered by the webs 712, 722 and the base bodies 711, 721, is formed through the connection of the two supporting body parts 71, 72 in the web area. Both base bodies 711, 721 and the force transmitting/mounting element 43 have an approximately centered bore hole 7111, 7121 for the feeding through of a threaded rod or the like. Through the hollow space, the supporting body 70 in the area of the largest load between the neck bearing 21 and the rudder blade connection area 301 is deformed elastically into the hollow space 73, so that a type of spring effect occurs.

FIG. 4 shows the first supporting body part 71 from FIG. 3. An end area of the winding mandrel 80, which rests circumferentially and with its entire surface against the inside of the web 712, engages inside the web 712. The winding mandrel 80 comprises a cylindrical roller 81, onto which a mandrel adapter 82 modified for the dimension of the rudder stock 40 to be wound or respectively for the dimension of the first supporting body part 71 is placed. The force transmitting/ mounting element 43 of the supporting body part 71 is held by a flange 831 of a holding tool 83. Furthermore, the holding tool 83 has a nail collar 832, around which a fiber material (not shown here) wound on rollers or spools can be attached. The wound material held by the nail collar 832 can be coiled around the profiled outer area of the first supporting body part 71 and then further around the winding mandrel 80 in order to form the fiber-composite tube 46. After completion of the fiber-composite tube 46, the wound core 80 and if applicable the holding tool 83 is removed from the holder of the first supporting body part 71. Furthermore, the second supporting body part 72 can now be inserted through the end of the fiber-composite tube 46 arranged removed from the first supporting body part 71 and moved up to the first supporting body part 71. As soon as the two supporting body parts 71, 72 are jointed together, an interference fit assembly can be established between both so that the supporting body 70 is established. The interference fit assembly can take place for example through icing of the second supporting body part 72 before insertion into the fiber-composite tube 46 and subsequent heating in the tube 46.

List of References
100 Rudder
10 Ship's hull
11 Steering gear
12 Ship propeller
20 Rudder trunk
20a Lower rudder trunk end
20b Upper rudder trunk end
21 Neck bearing
30 Rudder blade
31 Fin
32 Fin steering
33 Hydraulic nut
301 Rudder blade connection area
40 Rudder stock
41 Upper end area
42 Lower end area
43 Force transmitting/mounting element
45 Middle rudder stock area
46 Fiber-composite tube
47 Protective liner
431 Thread
461 Free end
51 Pin
60 Windings of the fiber-composite material
70 Supporting body
71 First supporting body part
72 Second supporting body part
73 Hollow space
711 Base body
712 Web
721 Base body
722 Web
7111 Bore hole
7121 Bore hole
80 Winding mandrel
81 Roller
82 Mandrel adapter
83 Holding tool
831 Flange
832 Nail collar

The invention claimed is:

1. A rudder stock for rudders for water vehicles comprising an upper end area, a middle area, and a lower end area, wherein the lower end area comprises a tube made of a non-metallic material, wherein the tube of the lower end area of the rudder stock when mounted in the rudder protrudes downwards from a lower end of a lower neck bearing of the rudder, wherein the lower end area of the rudder stock includes a hollow supporting body for supporting the rudder stock against bending loads introduced by water pressure acting on the rudder, wherein the hollow supporting body is separate from the tube of the lower end area, and wherein the hollow supporting body is disposed inside the tube of the lower end area of the rudder stock.

2. The rudder stock according to claim 1, wherein the middle and lower end areas of the rudder stock comprise a tube made of fiber composite material, and wherein the upper end area of the rudder stock is coupled with a steering gear of a water vehicle and comprises a metallic material.

3. The rudder stock according to claim 1, wherein the hollow supporting body is made of metal.

4. The rudder stock according to claim 1, wherein the hollow supporting body is permanently connected to the tube.

5. The rudder stock according to claim 4, wherein the non-metallic material is a fiber composite material.

6. The rudder stock according to claim 1, wherein the hollow supporting body comprises a mounting element protruding from the lower end area of the rudder stock, wherein the mounting element transmits bending loads introduced by water pressure acting on the rudder from the rudder blade to the rudder stock.

7. The rudder stock according to claim 1, wherein at least part of the surface area of the hollow supporting body is designed in a wave pattern outline or profile.

8. The rudder stock according to claim 1, wherein the hollow supporting body is elastically bendable.

9. The rudder stock according to claim 1, wherein the hollow supporting body has a first part and a second part, wherein the first part has a circumferential web protruding therefrom connected with the second part thereby forming a hollow space in between the first and second parts.

10. The rudder stock according to claim 9, wherein the circumferential web is ring-shaped.

11. The rudder stock according to claim 10, including an interference fit assembly between the first and second parts.

12. The rudder stock according to claim 1, wherein the rudder stock further comprises a protective metal liner enveloping the lower end area of the rudder stock.

13. The rudder stock according to claim 1, wherein the non-metallic material is a fiber composite material.

14. A rudder for water vehicles, comprising a rudder blade with a lower neck bearing and a rudder stock with a lower end area, wherein the lower end area of the rudder stock is partially inserted into the rudder blade and held in place therein by the lower neck bearing, wherein the lower end area of the rudder stock comprises a tube made of a non-metallic material, wherein the tube of the lower end area of the rudder stock protrudes downwards from a lower end of the lower neck bearing, wherein the tube of the lower end area of the rudder stock includes a hollow supporting body for supporting the rudder stock against bending loads introduced by water pressure acting on the rudder, wherein the hollow supporting body is separate from the tube of the lower end area, and wherein the hollow supporting body is disposed inside the tube of the lower end area of the rudder stock.

15. The rudder according to claim 14, wherein the hollow supporting body is made of metal, wherein the rudder blade is mounted onto the rudder stock via the hollow supporting body.

16. The rudder according to claim 14, wherein the lower end area of the rudder stock further comprises a protective metal liner wherein the protective metal liner covers the lower end area of the rudder stock where the rudder blade is mounted onto the rudder stock.

17. The rudder stock according to claim 14, wherein the non-metallic material is a fiber composite material.

18. A lower end area of a rudder stock inserted into a rudder for water vehicles and mounted in the rudder, wherein the lower end area comprises a tube made of non-metallic material, wherein the tube of the lower end area when mounted in the rudder protrudes downwards from a lower end of a lower neck bearing of the rudder, wherein the lower end area of the rudder stock comprises a hollow supporting body made of metal and enveloped in a non-metallic material for supporting the rudder stock against bending loads introduced by water pressure acting on the rudder, wherein the hollow supporting body is separate from the tube of the lower end area.

19. The lower end area of a rudder stock according to claim 18, wherein the hollow supporting body comprises a protruding mounting element for transmitting a force exerted on a rudder blade to the rudder stock.

20. The rudder stock according to claim 18, wherein the non-metallic material is a fiber composite material.

21. A method for producing a lower end area of a rudder stock inserted into a rudder for water vehicles and mounted in the rudder, wherein the produced lower end area comprises a tube made of a non-metallic material, wherein in a mounted state a lower end of the tube protrudes downward from a lower neck bearing of the rudder, comprising the steps of:
    attaching a hollow metal supporting body to the lower end area of the rudder stock; and
    winding fiber material at least partially around the hollow metal supporting body to form a tube around the hollow metal supporting body, so that the hollow metal supporting body is disposed inside the tube.

22. The method according to claim 21, including the step of enveloping the hollow metal supporting body in a non-metallic material.

23. A method for the production of a rudder stock of a rudder for water vehicles, comprising the following steps:
    positioning a winding mandrel next to a first part of a supporting body,
    winding a fiber material around the first part of the supporting body using the winding mandrel,
    forming a fiber composite tube from the fiber material wound around the first part of the supporting body,
    removing the winding mandrel,
    inserting a second part of the supporting body into the fiber composite tube through an end of the fiber composite tube after the removing step,
    moving the second part of the supporting body through the fiber composite tube up to the first part of the supporting body, and forming an interference fit between the first part and the second part, and
    fastening an upper area of the rudder stock at a first end to the fiber composite tube formed around the supporting body and at an opposite end to a steering gear.

24. The method for production of the rudder stock for a rudder for water vehicles of claim 23, wherein the upper area of the rudder stock is metallic.

25. A process for the production of a rudder stock for a rudder for water vehicles, comprising the following steps:
    positioning a winding mandrel next to a first part of a supporting body,
    winding a fiber material around the first part of the supporting body using the winding mandrel, forming a fiber composite tube from the fiber material wound around the first part of the supporting body,
    removing the winding mandrel,
    inserting a second part of the supporting body into the fiber composite tube through an end of the fiber composite tube after the removing step,
    moving the second part of the supporting body through the fiber composite tube up to the first part of the supporting body, and forming an interference fit between the first part and the second part, and
    fastening an upper area of the rudder stock at a first end to the fiber composite tube formed around the first and the second part of the supporting body and at an opposite end to a steering gear.

* * * * *